(12) United States Patent
Cole

(10) Patent No.: US 7,034,084 B2
(45) Date of Patent: Apr. 25, 2006

(54) PROCESS AND APPARATUS FOR THE HYDROGENATION OF POLYMERS UNDER SUPERCRITICAL CONDITIONS

(75) Inventor: William Cole, Clinton, OH (US)

(73) Assignee: Bridgestone Corporation, Tokyo (JP)

( * ) Notice: Subject to any disclaimer, the term of this patent is extended or adjusted under 35 U.S.C. 154(b) by 100 days.

(21) Appl. No.: 10/614,843

(22) Filed: Jul. 8, 2003

(65) Prior Publication Data

US 2005/0250912 A1    Nov. 10, 2005

Related U.S. Application Data

(60) Provisional application No. 60/394,488, filed on Jul. 8, 2002.

(51) Int. Cl.
*C08C 19/02* (2006.01)

(52) U.S. Cl. ............... 525/338; 525/339; 422/129; 422/138

(58) Field of Classification Search ........... 525/338, 525/339; 422/129, 138
See application file for complete search history.

(56) References Cited

U.S. PATENT DOCUMENTS

| 4,390,411 | A | 6/1983 | Scinta et al. |
|---|---|---|---|
| 4,478,705 | A | 10/1984 | Ganguli |
| 4,485,003 | A | 11/1984 | Coenen et al. |
| 6,002,047 | A | 12/1999 | Jansen et al. |
| 6,087,003 | A * | 7/2000 | Benoit et al. ............... 428/403 |
| 6,156,933 | A | 12/2000 | Poliakoff et al. |
| 6,858,665 | B1 | 2/2005 | Larson |
| 6,861,462 | B1 | 3/2005 | Parker et al. |

FOREIGN PATENT DOCUMENTS

WO          WO 96/01304          *    1/1996

* cited by examiner

*Primary Examiner*—Ling-Sui Choi
(74) *Attorney, Agent, or Firm*—Arthur M. Reginelli; Meredith E. Palmer

(57) ABSTRACT

The present invention provides a process for the hydrogenation of a polymer under supercritical conditions. A reaction mixture of hydrogen, at least one polymer, at least one hydrogenation catalyst, and appropriate solvent(s) for the at least one polymer and catalyst is provided and is pressurized and heated to meet or exceed a determined critical pressure and determined critical temperature for the reaction mixture. The hydrogenation occurs under these supercritical conditions, thereby overcoming the hydrogen solubility and mass transfer problems typically encountered in hydrogenation methods at subcritical conditions, wherein hydrogen must be pressurized into solvent to reach the polymer.

7 Claims, 4 Drawing Sheets

Figure 3 - Critical Properties of Mixtures of Hydrogen and n-Hexane

_US 7,034,084 B2_

PROCESS AND APPARATUS FOR THE HYDROGENATION OF POLYMERS UNDER SUPERCRITICAL CONDITIONS

CROSS-REFERENCE TO RELATED APPLICATIONS

This application claims the benefit of U.S. Provisional Application No. 60/394,488 filed on Jul. 8, 2002.

BACKGROUND OF THE INVENTION

This invention generally relates to a process and apparatus for the hydrogenation of polymers. More particularly, the present invention relates to a process and apparatus for the hydrogenation of polymers under supercritical conditions.

Processes for the hydrogenation of polymers in solution are typically characterized by very long reaction cycle times, on the order of several hours. This low productivity results in economic in efficiency. Hydrogenation of polymers has traditionally been conducted as a batch process, with hydrogen gas being pressurized into solution to reach the polymer. A catalyst is also typically employed. Although the catalyzed reaction between hydrogen and the double bonds of a polymer is quite rapid, the apparent rate of the reaction is relatively slow due to two factors. First, the rate of mass transfer of hydrogen gas across the gas/liquid interface is slow—even at high pressures, with vigorous agitation. Second, hydrogen solubility is generally poor, in the solvent systems typically employed such that, even with exceptional interphase transfer rates, the concentration of hydrogen available (dissolved) in the liquid phase is always quite low. While it might be proposed to compensate for the low solubility of hydrogen by operating at higher hydrogen gas pressures, the resulting increase in the rate of reaction would be modest. Additionally, the capital cost and safety concerns associated with the large batch reactors required for such conditions would be undesirable.

To overcome problems encountered in the prior art, the present invention investigates hydrogenating polymers under supercritical conditions. With reference to FIG. 1, it can be seen that, for a pure component that is subject to increases in temperatures and pressures, there exists a "critical point" above which the pure component enters the supercritical phase and exhibits supercritical phase behavior. The critical point represents the intersection of the critical pressure and critical temperature lines in the phase diagram, and, thus, a pure component or multi-component mixture is in the supercritical phase when "above the critical point." The "critical temperature" is the temperature above which no amount of pressure increase will cause the component to liquefy from the supercritical phase. Likewise, the "critical pressure" is the pressure at which no amount of temperature increase will cause the component to evaporate from the supercritical phase to the gas or other phase.

It is well established that mixtures of gases and liquids that are heated and pressurized above the critical point for the specific mixture become a single phase, with essentially complete miscibility. Additionally, under supercritical conditions the viscosity and density of the mixture is typically lower than the previous phase, and the molecular diffusivity is greatly increased, as is the thermal conductivity of the mixture. Thus, the present invention investigates the hydrogenation of polymers under supercritical conditions, because supercritical mixtures do not appear to suffer from the problems associated with the hydrogenation of polymers in two-phase (gas/liquid), heterogeneous systems. Particularly, under supercritical conditions, there is no need to pressurize hydrogen gas into a solvent system, because each component is in a single supercritical phase, and hydrogen could be more efficiently employed. Mass transfer problems, as mentioned above, would likewise be eliminated because interphase boundaries cease to exist at supercritical conditions.

Thus, it is believed that, under supercritical conditions, the reactions involved in the hydrogenation of polymers would be limited only by the rapid kinetics of the reaction between hydrogen and the double bonds of the polymer, in light of the characteristics of mixtures in the supercritical phase. However, supercritical operation is normally associated with extreme levels of pressure and temperature, and these operating conditions usually mandate high capital investments and operating costs. Safety is also an important issue, especially when materials such as hydrogen and typical polymer solvents are involved.

The present invention investigates a very practical way to apply the strong merits offered by supercritical processing to the hydrogenation of polymers, while minimizing capital investment, operating costs, and safety concerns, relative to the subcritical technology previously considered.

SUMMARY OF INVENTION

In general, the present invention provides a process for the hydrogenation of a polymer comprising the steps of: providing a polymer solution of at least one polymer in at least one solvent; metering hydrogen gas and an hydrogenation catalyst solution into the polymer solution to create a reaction mixture; pressurizing and heating the reaction mixture such that the contents of the reaction mixture exist in the supercritical phase; and hydrogenating said at least one polymer while the contents of the reaction mixture are in the supercritical phase.

The present invention also provides a process for the hydrogenation of a polymer comprising the steps of: determining the critical temperature and critical pressure for a mixture of hydrogen, at least one polymer, and at least one appropriate solvent for the at least one polymer; providing a polymer solution of the at least one polymer in the at least one appropriate solvent; metering, the hydrogen gas and an hydrogenation catalyst solution into said polymer solution, to create a reaction mixture; pressurizing and heating the reaction mixture to meet or exceed the determined critical pressure and determined critical temperature of said step of determining; and hydrogenating the at least one polymer at or above the determined critical pressure and determined critical temperature.

The present invention further provides an apparatus for the hydrogenation of a polymer comprising: a tubular coil reactor installed in a pressure vessel that is partly filled with a heat sink fluid to cover at least a portion of said tubular coil reactor; a pump metering polymer solution, hydrogen, and hydrogenation catalyst solution to said tubular coil reactor to provide a reaction mixture in said tubular coil reactor, said tubular coil reactor being maintained at a temperature and pressure sufficient to place the contents of said reaction mixture in the supercritical phase; and condenser communicating with said pressure vessel to receive vapor from the heat sink fluid and convert it back to heat sink fluid liquid, and return the heat sink fluid liquid back to said pressure vessel.

Furthermore, this invention provides an apparatus for the hydrogenation of a polymer at or above a determined supercritical temperature and determined supercritical pressure comprising: a source of a polymer solution; a source of hydrogen a source of an, hydrogenation catalyst solution; a tubular coil reactor installed in a pressure vessel that is partly filled with a heat sink fluid to cover at least a portion of said tubular coil reactor, wherein said heat sink fluid is heated to near the determined supercritical temperature, and its saturation pressure is established, in the pressure vessel, such that the vapor phase of said heat sink fluid present in said pressure vessel is in equilibrium with the liquid phase of said heat sink fluid; a pump metering polymer solution, hydrogen, and hydrogenation catalyst solution, from their respective sources, to said tubular coil reactor, at or above the determined supercritical pressure; and a condenser communicating with said pressure vessel to receive heat sink fluid vapor and convert it back to heat sink fluid liquid, and return the heat sink fluid liquid back to said pressure vessel.

PREFERRED EMBODIMENT FOR CARRYING OUT THE INVENTION

Figure 1:
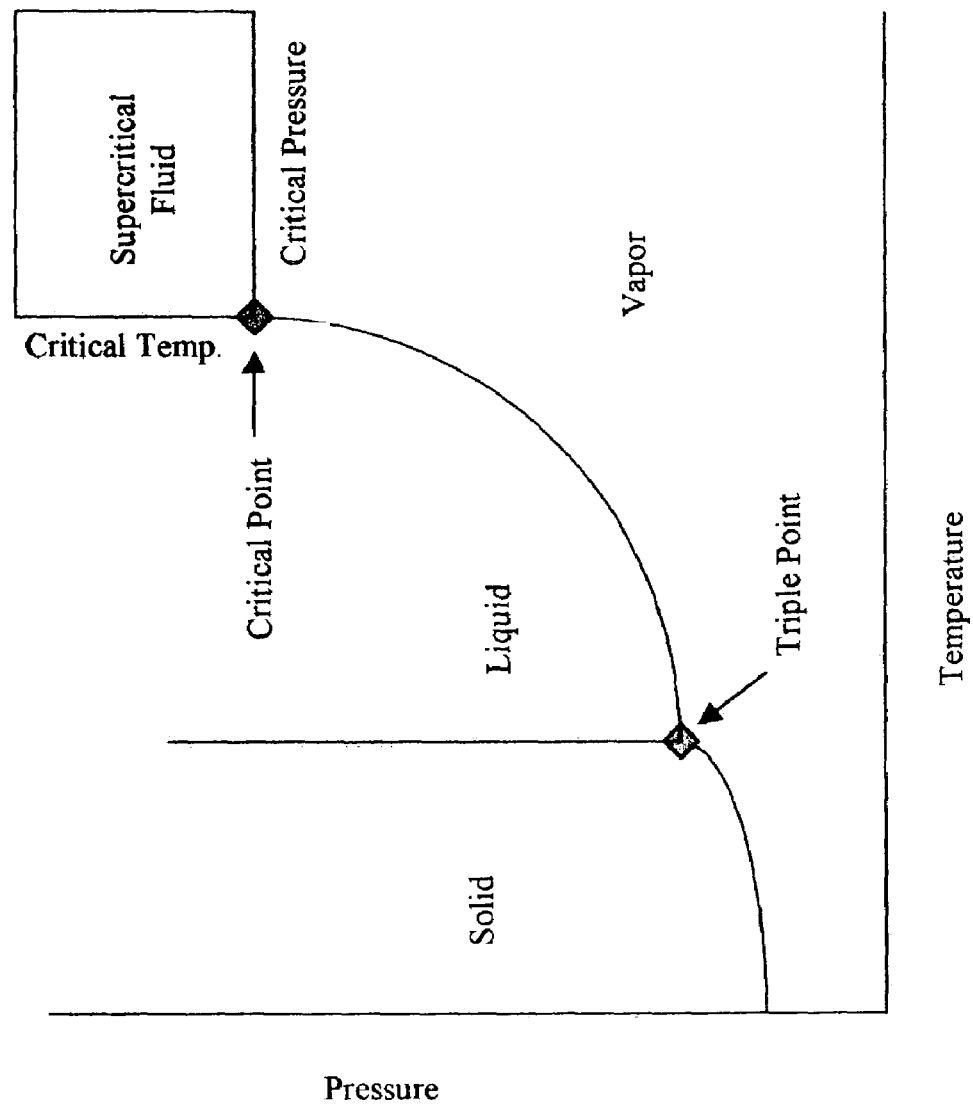
FIG. 1 is a typical phase diagram for a pure component.

The present invention improves the productivity and economic efficiency of the hydrogenation of polymers, and proposes a process and apparatus for the same, which process and apparatus are based upon the characteristics of supercritical fluids, particularly, multi-component mixtures under supercritical conditions. A necessary first step to operating at supercritical conditions is to consider the critical points of the principal materials involved. Thus, the various reagents and carriers and catalysts employed according to this invention are first considered, with consideration as to determining the critical points of these components following thereafter.

The types of hydrogenation reactions of concern herein involve the reaction of hydrogen with organic compounds, particularly polymers, containing different degrees of unsaturation. This invention focuses upon conducting hydrogenation reactions under, at least initially, homogeneous reactions conditions, wherein each component is dissolved in an appropriate solvent. Thus, the materials or components involved include hydrogen, the polymer(s) to be hydrogenated, catalyst(s) for the hydrogenation reaction, and appropriate solvent(s). As indicated in the previous statement, more than one polymer at a time might be hydrogenated according to this invention, and more than one hydrogenation catalyst and more than one solvent might be employed; however, each component is referred to in the singular, in the disclosure to follow, with such disclosure being intended to also cover situations employing a plurality of such components.

The polymers that might be employed in the present invention include virtually any polymer that is capable of being hydrogenated through a catalyzed reaction with hydrogen. Non-limiting examples of such polymers include polybutadiene, polyisoprene, styrene butadiene rubber, styrene isoprene rubber, styrene butadiene styrene, styrene isoprene styrene, polydiclorobutadiene, polydimethylbutadiene, nitrile rubber, polychloroprene (neoprene), polyethylene oxide, methyl acrylate, methyl acrylate, silicone-based polymers, polyacrylamide, and polybutadiene (block) nylon. The polymers employed may have a wide variety of copolymer composition, polybutadiene or polyisoprene microstructure, molecular weights, molecular weight distributions, etc. These and other polymers, hydrogenated according to this invention, will be useful in various technical fields. Without limitation, potential applications may include such polymers being employed as tire tread polymers, with stain-induced crystallinity; tire side walls; thermoplastic elastomer applications; tire sealants; constructions sealants, roofing membranes; surfactants; processing aids; lubricants; mold release agents; plastics and plastic alloys; and molding resins.

Regarding the term "appropriate solvents" as used herein, it should be appreciated that the solvent or solvents employed in the present invention are chosen according to their ability to dissolve the polymers and catalysts employed in the hydrogenation reaction. Particularly, the present invention focuses upon a hydrogenation reaction carried out under supercritical conditions. Thus, the solvents employed, while necessarily being chosen according to their ability to dissolve the polymer and catalysts employed, might also be chosen according to the relative ease with which mixtures of these solvents with hydrogen and the polymer to be hydrogenated might be made to enter the supercritical phase. Non-limiting examples of potential solvents for use according to this invention include normal and branched alkanes, such as n-hexane, 3-methyl pentane, and isobutene; cycloalkanes, such as cyclohexene and cyclopentane; alkenes, such as 1-hexene, isobutylene, and propylene; dienes, such as 1,3-butadiene and isoprene; aromatics, such as benezine, toluene and xylenes; alkyl substituted aromatics, such as ethylbenzene; and mixtures of any of the foregoing. Carbon dioxide is also a potential solvent, and could be used either alone, in appropriate circumstances, or with other solvents. Ethers might also work as solvents, either alone, or as part of a mix.

Useful catalysts for the hydrogenation of polymers are well known, and may be chosen according to the particular polymer and solvent being employed. Non-limiting examples of useful hydrogenation catalysts include those formed by the reduction, using alkyls of aluminum, lithium, and the like, or organic salts of metals of Group VIII of the periodic table, including iron, cobalt, nickel, palladium, platinum, rhodium, ruthenium, osmium, and iridium. While catalysts that are soluble in the reaction mixture under the supercritical conditions employed in the invention are desirable, non-soluble and partially soluble catalyst species are also useful, and are within the scope of the invention. It will be understood that various additives, including, but not limited to agents to promote solubility and agents to enhance steric preference for reaction with one form of polymer over another, may be employed.

Hydrogen will typically be provided in this process as gaseous hydrogen. Once the desired polymer and appropriate solvents and catalysts are selected, the parameters, namely temperature and pressure, for conducting the hydrogenation reaction in the supercritical phase are determined, prior to attempting to practice the supercritical hydrogenation reaction. The procedure for finding suitable parameters will be briefly touched upon in the discussion of FIG. 2 and the "critical locus" or "locus of critical points."

Currently, it is believed that the hydrogen and solvent are the principal materials of concern in determining supercritical conditions of the reaction mixture involved in the present invention, namely, hydrogen, polymer, catalyst, and solvent. It is believed that the supercritical conditions for the reaction mixture can be determined by determining the supercritical conditions for a two-component hydrogen/solvent mixture, because the polymer, being dissolved in the solvent, should not appreciably affect the supercritical parameters of the solvent/hydrogen mixture employed. The polymer, should remain dissolved in the solvent, when in the supercritical phase, although it might be necessary to adjust temperatures and pressures to force precipitated polymer back into the supercritical solvent. For example, Arani and Cozewith, J. App. Poly. Sci. [31], 1879–99, (1986), showed that a mixture of ethylene and propylene rubber, in hexane solvent, precipitated out of the hexane, as the hexane went into the supercritical phase, but was thereafter dissolved into the supercritical hexane upon slight increases in pressure. As for the catalyst, it will be present in such small amounts that it should not appreciably affect the supercritical temperatures and supercritical pressures that are determined by analyzing the mixture of hydrogen and solvent, as will be discussed below.

In one method for determining supercritical conditions, a mixture of hydrogen and the chosen solvent is placed in a pressure vessel, and the critical point for that mixture is determined. This is repeated for a number of different concentrations of each component, hydrogen and solvent, in the mixture. In this manner, a critical locus can be obtained for a number of possible mixture concentrations, and, by using the plot of these critical points, the concentrations of each component within the hydrogen/solvent system can be chosen based upon the feasibility of producing the necessary supercritical conditions (temperature and pressure) for that system.

Figure 2:
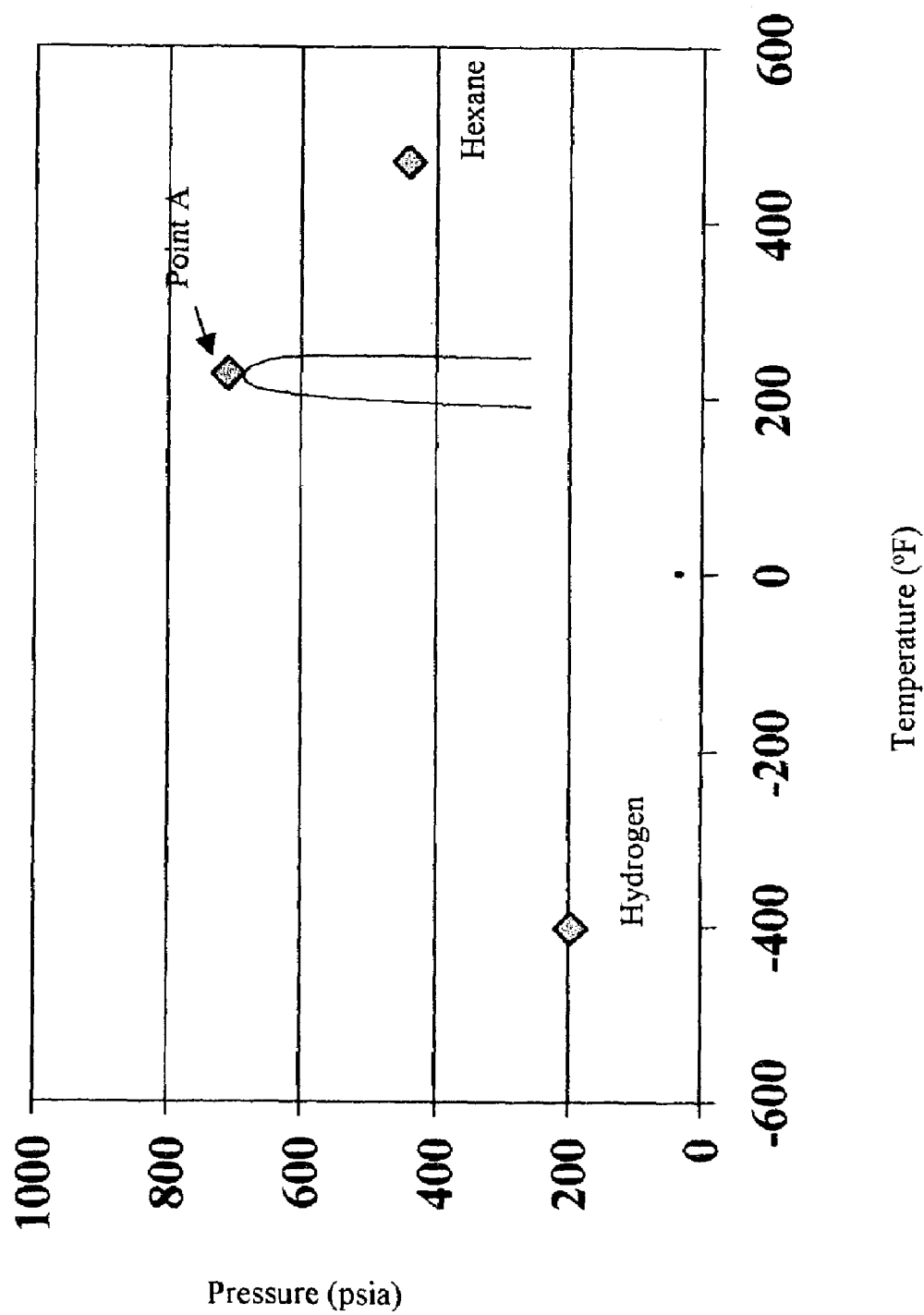
FIG. 2 is a plot of supercritical data for a two-component mixture, specifically of hydrogen and n-hexane.

In the exemplary plot of supercritical data shown in FIG. 2, mixtures of n-hexane and hydrogen are considered. The critical points for these materials are provided in Table 1, below.

| Material | Critical Temperature (° F.) | Critical Pressure (psia) |
| --- | --- | --- |
| n-hexane | +454 | 438.7 |
| Hydrogen | −400 | 190.4 |

FIG. 2 provides the general shape of the temperature-pressure phase diagram, including the supercritical region, for a multi-component mixture of hydrogen and n-hexane. The critical points for hydrogen and n-hexane are plotted. For a specific mixture of these components, a specific phase envelope (solid line) will exist. Inside this envelope, and below the critical point, two phases will exist. For that specific mixture, there will be a corresponding critical temperature and pressure, which will usually be located near, but not necessarily at, the peak of the envelope, identified in FIG. 2 as "Point A." For other mixtures of hydrogen and n-hexane, other specific phase envelopes will exist, with critical points located at or near the peak of the phase envelope. In FIG. 2, the dotted line connects the critical points of a number of possible hydrogen/hexane mixtures, and represents the "critical locus" or "locus of critical points" for the multi-component mixture.

As shown in FIG. 2 the critical temperature of the hydrogen/hexane mixture falls between those of the pure main components; however, it will be appreciated that this general trend might not always hold true. Regardless, this data will be useful for selecting of an hydrogen/solvent mixture that can enter the supercritical phase at an acceptable temperature and pressure for the operation of the process. This, again, neglects the presence of the polymer; however it is believed that the polymer will either remain dissolved in the supercritical fluid (solvent) or, if precipitated out, will dissolve back into the supercritical solvent upon slight increases in temperature and/or pressure. Thus, to the extent that the polymer might affect the system, the data obtained from a plot as in FIG. 2 will, at the least, provide ample estimates of the required supercritical conditions for carrying out the hydrogenation reaction.

Because of the great difference between the critical temperatures of the hydrogen and the solvents that will have to be employed, a wide range of possible process operating temperatures is feasible, depending on the ratio of hydrogen to solvent that is fed to the reactor. Also, operation in the supercritical region does not require operation exactly at the critical point, but, rather, at a temperature and pressure above critical. It is therefore possible, for example, to select the temperature of a polymer cement leaving a blend tank as the feed temperature to a continuous hydrogenation reactor according to this invention, with the reaction temperature determined by the balance between the rate of heat generation from the hydrogenation reaction and the rate of heat removal from the reactor. Thus, the hydrogenation process of this invention, may be practiced in-line with a polymerization process that creates a polymer to be hydrogenated.

Similar data may be plotted in another manner to determine feasible supercritical conditions for conducting the hydrogenation reaction for a given basic mixture. This method for predetermining supercritical conditions involves plotting supercritical temperatures and pressures as a function of the weight fraction of one of the components: solvent or hydrogen. This is substantively similar to the plotting of critical points, as discussed above, and an example is provided in FIG. 3, for hydrogen and n-hexane.

A method for determining supercritical conditions might also include the presence of the polymer in the solvent. First, the polymer is dissolved in the solvent, at a desired concentration. Then, hydrogen is added to the system, at differing concentrations, and the supercritical conditions are determined for the differing hydrogen additions. Visual observation of the entire mix will confirm or disconfirm whether the polymer remains dissolved in the solution, and, upon observation of precipitation of polymer, slight adjustments to the temperature and/or pressure of the system can be made and recorded. For a given concentration of polymer in solvent, critical properties of temperature and pressure can be plotted against the weight fraction of hydrogen added. The plot could then be employed to choose feasible operating conditions.

In most cases, when operating at supercritical conditions, high pressures are required, pressures that might be both impractical and unsafe in most types of reactors. Therefore, the present invention also provides an apparatus to address the high temperatures and pressures employed in the process of this invention.

Figure 4:
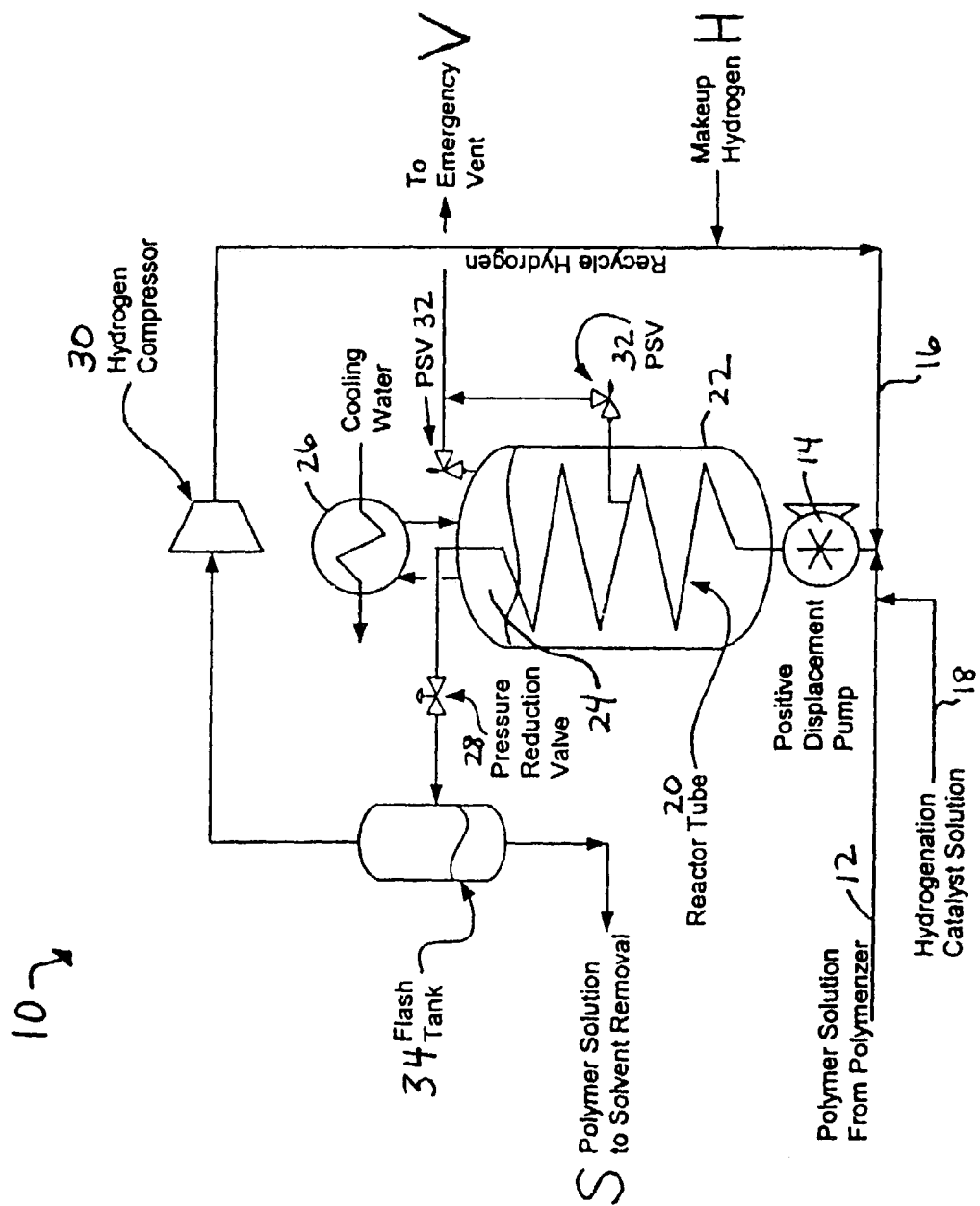
FIG. 4 is a flow diagram generally depicting the apparatus and process of the present invention.

FIG. 4 shows the proposed apparatus and process, designated generally by the numeral 10. Polymer solution 12, from a polymerization reactor or other appropriate source, is fed to the inlet of a positive displacement pump 14. Hydrogen gas 16 and a hydrogenation catalyst solution 18 are also metered to pump 14. Pump 14 discharges directly to a tubular coil reactor 20. Coil reactor 20 serves as the hydrogenation reactor, and is installed inside a large pressure vessel 22, which is filled with water. The water in pressure vessel 22 is heated to the desired reaction temperature for the hydrogenation reaction, determined as described above. Air and nitrogen are removed from the vapor space 24, by venting hot water vapor until reaching the saturation pressure at the chosen temperature. Thereafter, the temperature of the water can be controlled by varying either the flow rate or temperature of the media used to cool the condenser.

The temperature and pressure generated by pump 14 are chosen to exceed the critical pressure and temperature of the particular mixture of polymer(s), solvent(s), and hydrogen fed to the coil reactor 20. The heat generated by the reaction is very efficiently removed by the boiling of the water outside coil reactor 20. The water vapor rises to a reflux condenser 26 at the top of the pressure vessel 22, and is allowed to flow, as liquid water, back into the pressure vessel 22. Notably, the water in pressure vessel 22, surrounding coil reactor 20 could be replaced with any appropriate heat sink fluid. Replacing water with a different heat sink fluid would be within the ordinary skill in the art.

The hydrogenation reaction occurs in coil reactor 20, under supercritical conditions, and a mixture of solvent(s), hydrogenated polymer(s), and unreacted hydrogen leaves coil reactor 20, and passes through a pressure reduction valve 28, which reduces the pressure to below the critical value. This results in the release of unreacted hydrogen, as a gas, which is then compressed, at compressor 30, and recycled, along with makeup hydrogen, (generally represented at H)to the inlet of pump 14. The polymer solution and evolved gas are effectively separated at a flash tank 34, and, while the hydrogen gas goes to the compressor 30, the polymer solution advances to an appropriate solvent removal apparatus (generally represented at S)

To protect the equipment from damage due to excessive pressure, pressure safety valves 32 are installed at the top of pressure vessel 22 and at one or more points along coil reactor 20. These devices will allow material to pass to an enclosed vent recovery system (generally represented at V). Due to the very rapid rate of reaction inside coil reactor 20, the volume of material maintained at the high-pressure condition will be at a minimum. In the event of a rupture of coil reactor 20 (e.g., failure of the pressure safety valves), the reaction mixture would flow into the large volume of hot water (heat sink fluid), and thereby be greatly diluted. Additionally, any water-sensitive catalyst employed would be effectively quenched, if water was, indeed, the heat sink fluid.

EXPERIMENTAL

Figure 3:
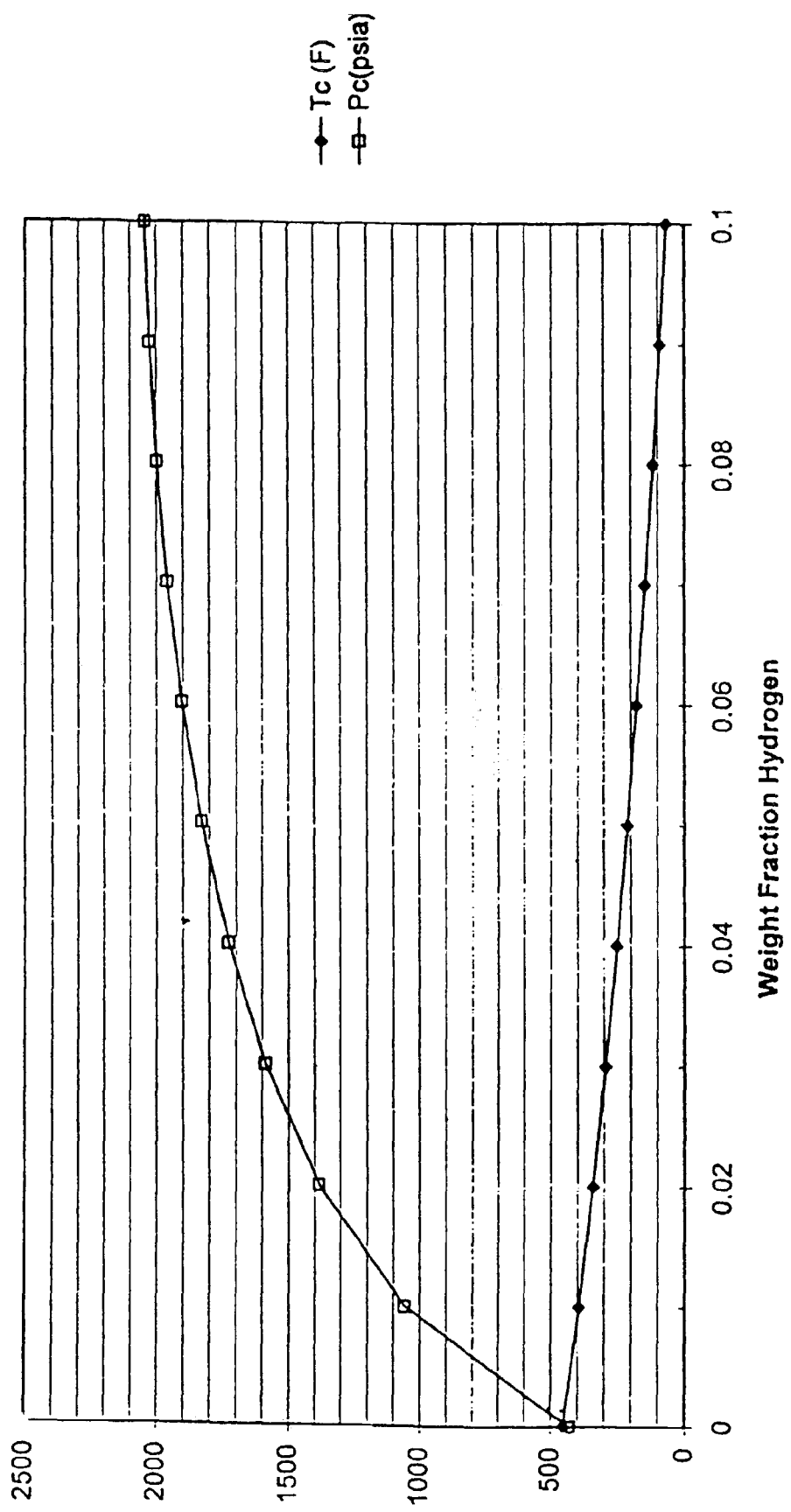
FIG. 3 is a plot of estimated supercritical temperatures and pressures for hydrogen/n-hexane mixtures, wherein both supercritical temperature and supercritical pressure are plotted as a function of the weight fraction of hydrogen in the mixtures.

As an example of required operating conditions, if a polybutadiene polymer dissolved in hexane were to be completely hydrogenated, the required stoichiometric weight fraction of hydrogen in the reaction mixture would be 0.001917. This assumes that the polymer concentration in the solution is at 20 weight percent. Reference to FIG. 3 shows the estimated corresponding critical pressure and temperature to be about 520 psia and 440° F., respectively. This temperature is probably excessively high, and may result in polymer and/or catalyst degradation. However, if the hydrogen concentration is increased to 0.050 weight fraction, the estimated critical temperature would drop to about 210° F., which is a very reasonable value. The estimated critical pressure rises to about 1820 psia, but this is still well within the capabilities of several types of commercially available positive displacement pumps (screw, piston, vane, progressive cavity, etc.).

To further exemplify the process disclosed herein, a hypothetical experiment is now disclosed in sequential steps, economic considerations making it impractical to provide complete experimental data at this time. It is believed that lithium polymerized polybutadiene may be hydrogenated according to this invention with results closely paralleling the following hypothetical.

First, the lithium polymerized polybutadiene would be dissolved in a solution and placed in a reaction chamber, such as the "Phase Monitor" device made by Supercritical Fluid Technologies, Inc. The polybutadiene chosen for this example would have a number average molecular weight of 150,000, and would be dissolved in a mixture of saturated hexane isomers, at 20 weight % polymer. 20 grams of this solution would be added to the Phase Monitor device.

Next, one gram of hydrogen gas would be added to the chamber, measure volumetrically.

A standard homogeneous, nickel-based hydrogenation catalyst (made by reducing an hexane solution of nickel octoate with triisobutylaluminumchloride) would be injected into the chamber via syringe and septum, in an amount corresponding to one milliequilivent of nickel per gram of polymer.

To effect supercritical conditions, the chamber pressure would be increased to 2000 psia, after which the mixture would be heated to 210° F.

Under such conditions, the contained volume should expand rapidly to fill the chamber. After 5 minutes, the mixture could be cooled and the pressure reduced to atmospheric. It is believed that analysis of the resulting, recovered polymer would reveal that approximately 98% of the original carbon-carbon double bonds had been saturated (hydrogenated).

The success of the above hypothetical should result from the ability to reach supercritical conditions, and, if such conditions were not met, it is believed that very little hydrogenation would take place. For instance, if the above hypothetical were repeated, and the chamber pressure was increased to only 1500 psia, the mixture would be unlikely to enter the supercritical phase, and would not expand to fill the chamber. The resulting hydrogenated polymer might have only approximately 20% of its carbon-carbon double bonds saturated (hydrogenated).

As a further hypothetical, a process employing the apparatus of this invention is disclosed. A continuous hydrogenation apparatus as described herein could be constructed, with the volume of the submersed coil being 100 ml.

The polymer solution described above (LiBd in hexane @ 20 wt %) metered into the coil at a rate such that the residence time in the coil is 5 minutes. The polymer solution, gaseous hydrogen and nickel catalyst solution in hexane could be fed at the same ratios as in Example 1. The back-pressure valve at the outlet of the coil, outside the outer vessel would be first preheated to 220° F., and any trapped air would be vented, so that water reflux is established, for temperature control.

The polymer solution would be collected in a second vessel, downstream of the backpressure valve, maintained at 100 psia. Under such conditions, it is believed that samples of the polymer solution taken periodically from the second vessel would be saturated to a level varying between 95 and 1005 of carbon-carbon double bonds.

Based upon the foregoing disclosure, it should now be apparent that the process herein provides an improved method for hydrogenating polymers. It should, however, be understood that any variations evident fall within the scope of the claimed invention, and, thus, the selection of specific component elements can be determined without departing from the spirit of the invention herein disclosed and described. In particular, the polymers, solvents, and catalysts particularly disclosed herein are provided as exemplary components, and the present invention is not to be specifically limited thereto or thereby. Moreover, as noted hereinabove, other means for predetermining supercritical conditions for a given hydrogenation reaction according to this invention can be substituted for the methods disclosed herein using plots of critical locus and plots of supercritical temperature and pressure as a function of the mole fraction of the reaction components. Additionally, reactors according to this invention are not necessarily limited to tubular reactors. Moreover, other means for heat removal can be substituted for the pressure vessel filled with heat sink fluid and its associated condenser. Thus, the scope of the invention shall include all modifications and variations that may fall within the scope of the attached claims.

What is claimed is:

1. A process for the production of an hydrogenated polymer comprising the steps of:
   providing an unsaturated polymer;
   combining the unsaturated polymer with hydrogen gas and an hydrogenation catalyst solution to create a reaction mixture, where the unsaturated polymer, hydrogen gas, and catalyst are dissolved in a solvent; and
   pressurizing and heating the reaction mixture such that the contents of the reaction mixture exist in the supercritical phase, thereby
   hydrogenating said unsaturated polymer.

2. The process of claim 1, further comprising the step of determining the critical temperature and the critical pressure for the hydrogen, the unsaturated polymer, and the solvent.

3. The process of claim 2, wherein said step of determining includes process steps selected from the group consisting of:
   (a)(i) mixing hydrogen and the at least one appropriate solvent at a given ratio,
   (a)(ii) determining the critical point for the mixture of step (a)(i), and
   (a)(iii) repeating said steps (a)(i) and (a)(ii) for a plurality of hydrogen to solvent ratios; and
   (b)(i) dissolving the unsaturated polymer in the at least one appropriate solvent,
   (b)(ii) adding hydrogen to a portion of the solution resulting in step (b)(i),
   (b)(iii) determining the critical point for the mixture resulting in step (b)(ii), and
   (b)(iv) repeating steps (b)(ii) and (b)(iii) for different weight fractions of hydrogen in the polymer solution of step (b)(i).

4. The process of claim 1, where the unsaturated polymer is selected form the group consisting of polybutadiene, polyisoprene, styrene butadiene rubber, styrene isoprene rubber, styrene butadiene styrene, styrene isoprene styrene, polydiclorobutadiene, polydimethylbutadiene, nitrile rubber, polychloroprene (neoprene), polyethylene oxide, methyl acrylate, methyl acrylate, silicone-based polymers, polyacrylamide, and polybutadiene (block) nylon.

5. The process of claim 1, where the solvent is selected from the group consisting of normal and branched alkanes, cycloalkanes, alkenes, dienes, aromatics, alkyl substituted aromatics and carbon dioxide.

6. The process of claim 1, where the hydrogenation catalyst includes lithium, iron, cobalts, palladium, platinum, rhodium, ruthenium, osmium, iridium, or mixtures thereof.

7. A process for the hydrogenation of a polymer comprising the steps of:
   determining the critical temperature and critical pressure for a mixture of hydrogen, at least one polymer, and at least one appropriate solvent for the at least one polymer wherein said step of determining includes process steps selected from the group consisting of:
   (a)(i) mixing hydrogen and the at least one appropriate solvent at a given ratio,
   (a)(ii) determining the critical point for the mixture of step (a)(i), and
   (a)(iii) repeating said steps (a)(i) and (a)(ii) for a plurality of hydrogen to solvent ratios; and
   (b)(i) dissolving the at least one polymer in the at least one appropriate solvent,
   (b)(ii) adding hydrogen to a portion of the solution resulting in step (b)(i),
   (b)(iii) determining the critical point for the mixture resulting in step (b)(ii), and
   (b)(iv) repeating steps (b)(ii) and (b)(iii) for different weight fractions of hydrogen in the polymer solution of step (b)(i);
   providing a polymer solution of the at least one polymer in the at least one appropriate solvent;
   metering hydrogen gas and an hydrogenation catalyst solution into said polymer solution, to create a reaction mixture;
   pressurizing and heating the reaction mixture to meet or exceed an appropriate critical pressure and critical temperature for the reaction mixture, as determined in said step of determining; and
   hydrogenating the at least one polymer at or above the determined critical pressure and determined critical temperature.

* * * * *